United States Patent
Buscher et al.

[19]

[11] Patent Number: 6,100,619
[45] Date of Patent: Aug. 8, 2000

[54] DRIVE APPARATUS, IN PARTICULAR FOR A SLIDING DOOR OF A MOTOR VEHICLE

[75] Inventors: Hans-Joachim Buscher, Dusseldorf, Germany; Lloyd Walker Rogers, Jr., Shelby Township; Brian Norman Orr, Clinton Township, Macomb County, both of Mich.

[73] Assignee: General Motors Corporation, Detroit, Mich.

[21] Appl. No.: 09/126,127

[22] Filed: Jul. 30, 1998

[51] Int. Cl.[7] .............................. H02K 7/10; H02K 7/06; E05F 15/00

[52] U.S. Cl. ............................... 310/99; 310/83; 49/280; 49/139

[58] Field of Search .................................. 310/99, 98, 83, 310/75 D, 68 B, 94; 49/280, 139; 74/640; 475/162, 177; 464/49, 60, 69, 51

[56] References Cited

U.S. PATENT DOCUMENTS

| | | | |
|---|---|---|---|
| 3,457,674 | 7/1969 | Catlett et al. | 49/340 |
| 3,495,108 | 2/1970 | Buskirk | 310/83 |
| 4,227,092 | 10/1980 | Campagnuolo et al. | 290/1 C |
| 4,690,010 | 9/1987 | Matsumoto et al. | 74/469 |
| 4,862,640 | 9/1989 | Boyko et al. | 49/213 |
| 4,984,385 | 1/1991 | Deland | 49/280 |
| 5,168,666 | 12/1992 | Koura et al. | 49/360 |
| 5,221,239 | 6/1993 | Catlett | 475/342 |
| 5,497,041 | 3/1996 | Kondoh et al. | 395/796 |
| 5,551,190 | 9/1996 | Yamagishi et al. | 49/360 |
| 5,613,321 | 3/1997 | Rizkovsky | 49/139 |
| 5,631,511 | 5/1997 | Schulmann et al. | 310/83 |
| 5,643,128 | 7/1997 | Kennedy | 475/168 |
| 5,722,937 | 3/1998 | Smith | 601/23 |
| 5,804,905 | 9/1998 | Knoerzer | 310/268 |
| 5,831,358 | 11/1998 | Bobay | 310/58 |

*Primary Examiner*—Nestor Ramirez
*Assistant Examiner*—Dang Dinh Le
*Attorney, Agent, or Firm*—Kathryn A. Marra

[57] ABSTRACT

A drive apparatus, in particular for the automatic actuation of a sliding door of a motor vehicle, comprising a fast running motor, the motor shaft of which is connected to a transmission with a large step-down ratio, the transmission having a first gear wheel which can be secured against rotation, via a releasable blocking device, and a second rotatable gear wheel which is rotationally fixedly connected to an output drive shaft and which is rotatable relative to the first gear wheel by the rotation of the motor when the first gear wheel is blocked, with the number of teeth of the first gear wheel only differing by a few teeth from the number of teeth of the second gear wheel and with the large step-down ratio being determined by this difference of the tooth numbers. By releasing the blocking device, the step-down ratio of the transmission changes. In particular a step-down ratio of 1:1 results. The transmission is thereby capable of being driven in reverse, so that a manual actuation of the sliding door of a motor vehicle is possible, without the requirement for a releasable clutch device between the sliding door and the drive apparatus.

11 Claims, 2 Drawing Sheets

DRIVE APPARATUS, IN PARTICULAR FOR A SLIDING DOOR OF A MOTOR VEHICLE

TECHNICAL FIELD

The present invention relates to a drive apparatus, in particular for the automatic actuation of a sliding door of a motor vehicle.

BACKGROUND OF THE INVENTION

Such drive apparatuses normally operate with an electric motor and a step-down transmission. The small amount of space available in the region of the door proves to be problematic. Moreover, it must be ensured that the door can also be moved manually with as little force as possible.

SUMMARY OF THE INVENTION

The object of the invention is to set forth a drive apparatus of the initially named kind which has a low space requirement and enables easy manual movement of the door.

This object is satisfied by a drive apparatus having a fast running motor, the motor shaft of which is connected to a transmission with a large step-down ratio, the transmission having a first gear wheel which can be secured against rotation, via a releasable blocking device, and a second rotatable gear wheel which is rotationally fixedly connected to an output drive shaft and which is rotatable relative to the first gear wheel by the rotation of the motor when the first gear wheel is blocked, with the number of teeth of the first gear wheel only differing by a few teeth from the number of teeth of the second gear wheel and with the large step-down ratio being determined by this difference of the tooth numbers.

Through these features a high transmission step-own ratio can be realized in a small space. By releasing the blocking device, the high step-down ratio of the transmission can also be changed to a 1:1 ratio. The transmission can thereby be driven in reverse, so that the sliding door can be actuated manually without it being necessary to provide a releasable clutch device between the sliding door and the drive apparatus as in the known drive apparatuses. Through this, both the space required and the costs are also reduced.

The transmission of the drive apparatus of the invention is preferably formed in the manner of a so-called harmonic drive or flex drive transmission comprising a hollow gear having an inner toothed ring, the so-called circular spline, and a flexible ring with an outer toothed rim, the so-called flex spline, arranged therein, with the circular spline being releasably fixable against rotation via the releasable blocking device and with the flex spline being rotationally fixedly connected to the output drive shaft or vice versa. The use of a such a transmission has proved to be advantageous with regard to the operational reliability and to the space requirement.

In accordance with a further embodiment of the invention the transmission is formed in the manner of a cyclo transmission comprising a rigid hollow gear, having an inner ring of teeth and a cam disc arranged therein which can be moved by means of an eccentric device, with the hollow gear being capable of being secured against rotation via the releasable blocking device and the cam disc being rotationally fixedly connected to the output drive shaft or vice versa. This variant has also proved to be advantageous with respect to the space requirement and to the operational reliability.

In accordance with a further design of the invention the blocking device is electrically actuatable. The blocking device is preferably automatically actuated together with the motor. In this way the operation of the drive apparatus can be realised in a simple manner with a high step-down ratio through actuation of the blocking device and with a low step-down ratio on releasing the blocking device.

It is particularly preferable when the blocking device operates electromagnetically. The blocking device can in particular be formed as an electromagnetic brake. This is very reliable in operation.

In accordance with a further embodiment of the invention a sensor is present for detecting a motor rotation. It can be advantageously determined via the sensor whether the sliding door is moving because, in the drive apparatus of the invention which does not require a coupling device, the motor always turns when the sliding door is moving.

The sensor is preferably integrated into the motor and is thereby better protected against environmental influences.

In a further embodiment of the invention the motor is formed as a disc armature or pancake motor. This is a very cost-favorable quick running type of motor. As a result of the high step-down ratio of the transmission used for the drive apparatus of the invention, this motor can be used without problem and the manufacturing costs of the apparatus can be lowered in this way.

In accordance with a further embodiment of the invention the transmission drives a drum onto which and from which a draw means, in particular a draw cable, can be wound and unwound. A design of this kind has proved advantageous for the actuation of a sliding door or similar articles.

BRIEF DESCRIPTION OF THE DRAWINGS

The present invention will now be described, by way of example, with reference to the accompanying drawings, in which:FIG.

DESCRIPTION OF THE PREFERRED EMBODIMENT

Figure 1:
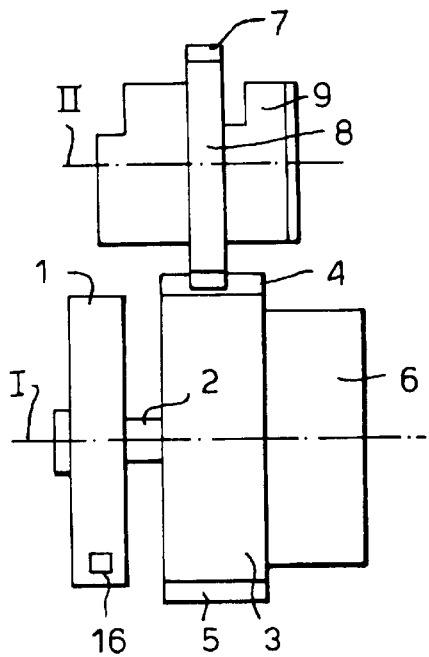
FIG. 1 is a schematic side view of a drive apparatus in accordance with the invention.

The drive apparatus shown in FIG. 1 includes a motor 1 which is in particular formed as a disc armature or pancake motor, with the motor shaft 2 of the motor 1 being connected to a transmission 3. The transmission 3 has an output drive gear 4 with outer teeth 5 and a blocking device 6 which is in particular formed as an electromagnetic brake. The outer teeth 5 of the output drive gear 4 stand in engagement with the outer teeth 7 of a ring of teeth 8 on a drum 9 which is rotatably journalled about an axis II. A non-illustrated draw cable can be wound onto and unwound from the drum 9 and acts in turn on a sliding door of a motor vehicle, which is likewise not illustrated. An activation of the motor 1 thus leads to an actuation of the sliding door by rotation of the drum 9.

Figure 2:
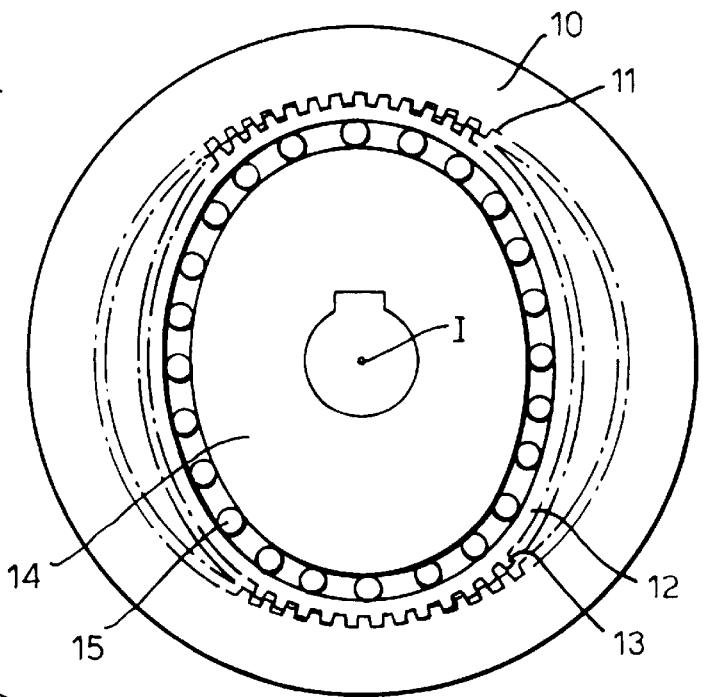
FIG. 2 is a schematic plan view of the front side of a transmission which can be used in the drive apparatus of FIG. 1.

The transmission 3, which is not shown in more detail in FIG. 1, can, for example, be formed in the manner shown in FIG. 2. The basic layout thereby corresponds to a so-called harmonic drive or flex drive transmission of a type known per se. A flexible ring 12 with outer teeth 13 is arranged within a rigid hollow gear 10 having inner teeth 11. In this embodiment the number of teeth of the inner toothed arrangement 11 is selected to differ from the number of teeth of the outer toothed arrangement 13. By way of example, the inner toothed arrangement 11 has 52 teeth and the outer toothed arrangement 13 has 50 teeth.

An elliptical body 14 is rotatably journalled within the flexible ring 12 about an axis which corresponds to the motor axis I. The elliptical body 14 is rotationally fixedly connected to the motor shaft 2. In addition, a ball bearing 15 is provided between the elliptical body and the flexible ring 12. The rigid hollow gear 10 is likewise rotatably journalled about the axis 1, but can be blocked via the blocking device 6 against rotation. The manner of operation of the transmission is as follows:

On activating the motor 1, the blocking device 6 is automatically actuated at the same time and the hollow gear 10 is thereby blocked. Through the rotation of the motor shaft 2 the elliptical body 14 rotates and brings the teeth of the outer toothed arrangement 13 of the flexible ring 12 into engagement with the teeth of the inner toothed arrangement 11 of the hollow gear 10 in each case in the region of the main axis of the ellipse. As a result of the different number of teeth of the outer toothed arrangement 13 and of the inner toothed arrangement 1 the flexible ring 12 thus rotates about the axis I. To this extent, the function corresponds to that of a known harmonic drive transmission.

In the described example with 52 and 50 teeth, the flexible ring 12 rotates by one tooth relative to the hollow gear 10, i.e. about the axis I, on a rotation of the motor shaft 2, and thus of the elliptical body 14, through 180°. With a full rotation the flexible ring 12 moves on by two teeth. In this way, a step-down ratio of 1:25 arises. The step-down ratio generally corresponds to the difference of the number of teeth divided by the total number of the teeth of the flexible ring 12.

The flexible ring 12 is coaxially arranged relative to the output drive gear 4 and rotationally fixedly connected thereto. The rotation of the output drive gear 4 thus corresponds to the rotation of the flexible ring 12.

On stopping the electric motor 1, the blocking device 6 is also released. The hollow gear 10 can now be rotated about the axis I. On manual shifting of the sliding door, the hollow gear 10 now rotates, together with the flexible ring 12, about the axis I. In this way the motor is driven with a transmission ratio of 1:1. When the motor 1 is stopped, the transmission of the invention can thus be driven backwardly.

A sensor 16 can finally be provided in the area of the motor and detects a rotation of the motor 1 about the axis I. This can, for example, be a sensor which operates with light. The motor 1 is, namely, turned about the axis I on manual actuation of the sliding door, as a result of the design of the drive apparatus without a clutch in accordance with the invention. The manual actuation can thus be detected simply in this manner, by means of the sensor, in particular in order to activate the motor 1 to assist the door movement.

Figure 3:
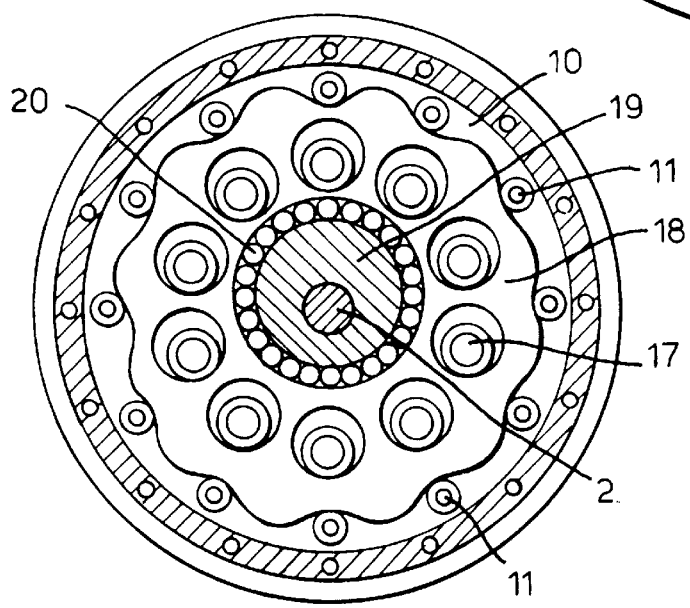
FIG. 3 is a schematic plan view of the front side of a variant of a transmission which can be used in the drive apparatus of FIG. 1.
Figure 4:
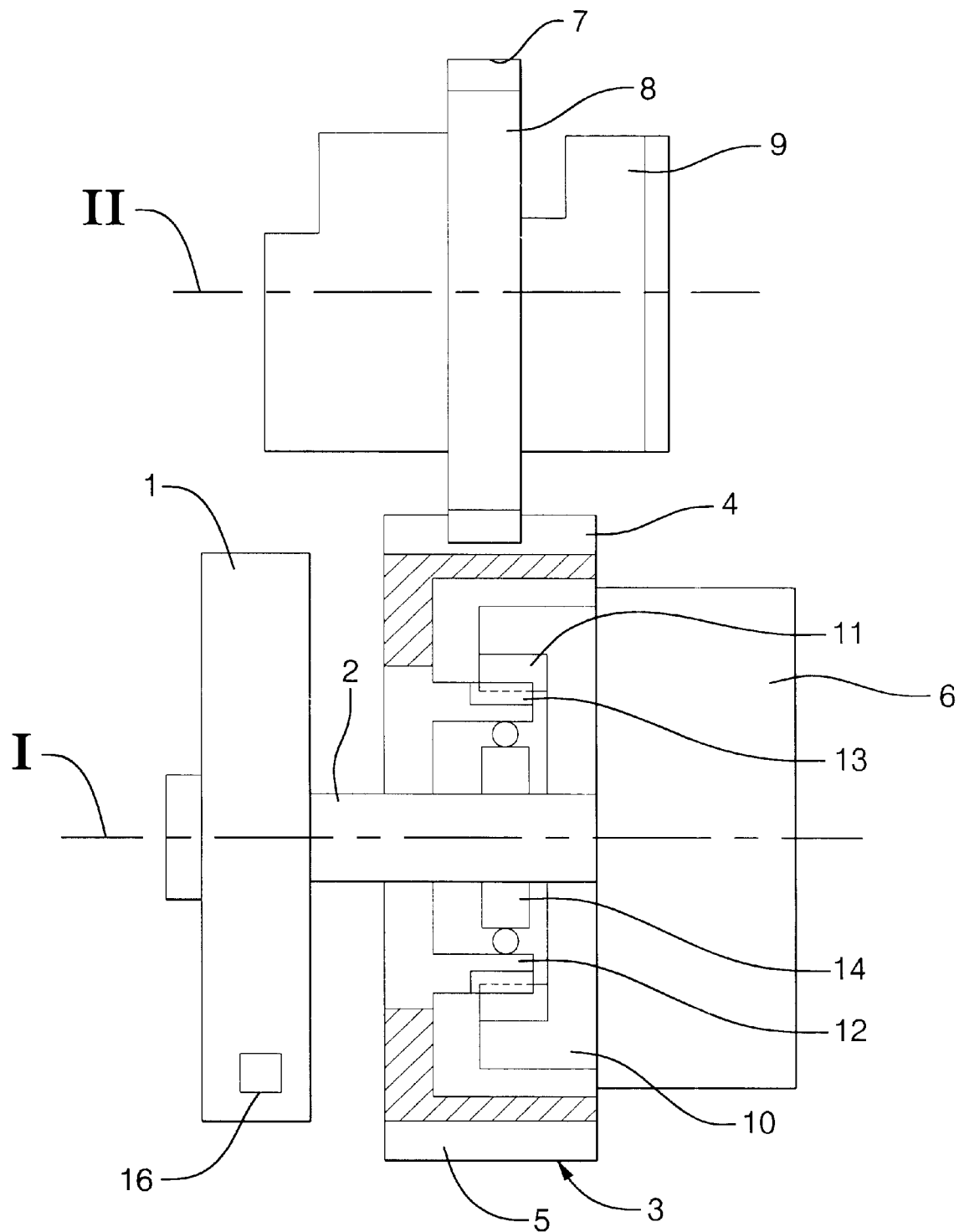
FIG. 4 is a schematic partially sectioned plan view of the front side of the drive apparatus of FIG. 1 using the transmission of FIG. 2.

In corresponding manner, the invention can be realized with the transmission shown in FIG. 3 which corresponds from its basic layout to a cyclo (or cycloidal) transmission known per se. The output drive gear 4 is then connected via pins 17 to the inwardly disposed cam disc 18 of the cyclo transmission, while the outer hollow gear 10 can be fixed via the blocking device 6 for the motor operation and can be released for manual actuation, so that the transmission can also be driven backwardly here when the motor is stopped. The cam disc 18 is in other respects moved via the motor shaft 2 by means of an eccentric element 19 through the intermediary of a ball bearing 20.

The hollow gear 10 could also, in each case, basically be rotationally fixedly connected to the output drive gear 4 and, in exchange, the flexible ring 12 or the inner cam disc 18 of the cyclo transmission can be fixed via the blocking device 6 against a rotation about the motor axis I. In this case, a high step-down ratio also results in motor operation and a ratio of 1:1 during manual operation, so that the transmission can be driven backwardly.

What is claimed is:

1. Drive apparatus, for the automatic actuation of a sliding door of a motor vehicle, comprising a fast running motor, the motor shaft of which is connected to a transmission with a large step-down ration, the transmission having a first gear wheel, which is secured against rotation, via a releasable blocking device that allows rotation of the first gear wheel when released, and a second rotatable gear wheel, which is rotationally fixedly connected to an output drive gear and which is rotatable relative to the first gear wheel by the rotation of the motor when the first gear wheel is blocked, with the number of teeth of the first gear wheel only differing by a few teeth from the number of teeth of the second hear wheel and with the large step-down ration being determined by this difference of the tooth numbers.

2. Drive apparatus in accordance with claim 1, wherein the transmission is formed as a harmonic drive or flex drive transmission comprising a rigid hollow gear with an inner toothed ring (circular spline) and a flexible ring arranged therein and having an outer toothed ring (flex spline) in which the circular spline or the flex spline can be releasably fixed against rotation via the blocking device and the flex spline or circular spline, is rotationally fixed connected to the output drive gear.

3. Drive apparatus in accordance with claim 1, wherein the transmission is a cyclo transmission comprising a rigid hollow gear with an inner toothed ring and a cam disk arranged therein, wherein the hollow gear or the cam disc can be releasably fixed via the blocking device against rotation and the cam disc or hollow gear, is rotationally fixedly connected to the output drive shaft.

4. Drive apparatus in accordance with claim 1, wherein the blocking device is electrically actuatable.

5. Drive apparatus in accordance with claim 4, wherein the blocking device operates electromagnetically.

6. Drive apparatus in accordance with claim 1, wherein a sensor is present for the detection of a rotation of the motor.

7. Drive apparatus in accordance with 6, wherein the sensor is integrated into the motor.

8. Drive apparatus in accordance with claim 1, wherein the motor is formed as a disc armature or pancake motor.

9. Drive apparatus in accordance with claim 1, wherein the transmission drives a drum onto which and from which a draw means can be wound and unwound.

10. Drive apparatus in accordance with claim 9, wherein the draw means is a draw cable.

11. Drive apparatus, for the automatic actuation of a sliding door of a motor vehicle, comprising a fast running motor, the motor shaft of which is connected to a transmission with a large step-down ratio, the transmission having a first gear wheel which can be secured against rotation, via a releasable blocking device that allows rotation of the first gear wheel when deactivated, and a second rotatable gear wheel which is rotationally fixedly connected to an output drive gear and which is rotatable relative to the first gear wheel by the rotation of the motor when the first gear wheel is blocked, with the number of teeth of the first gear wheel only differing by a few teeth from the number of teeth of a second wheel and with the large step-down ratio being determined by this difference of the tooth numbers, the blocking device being electrically actuable and automatically activated together with the motor.

* * * * *